March 30, 1937.　　O. F. LUNDELIUS ET AL　　2,075,531
VEHICLE CHASSIS-FRONT END CONSTRUCTION
Filed Aug. 7, 1933　　2 Sheets-Sheet 1
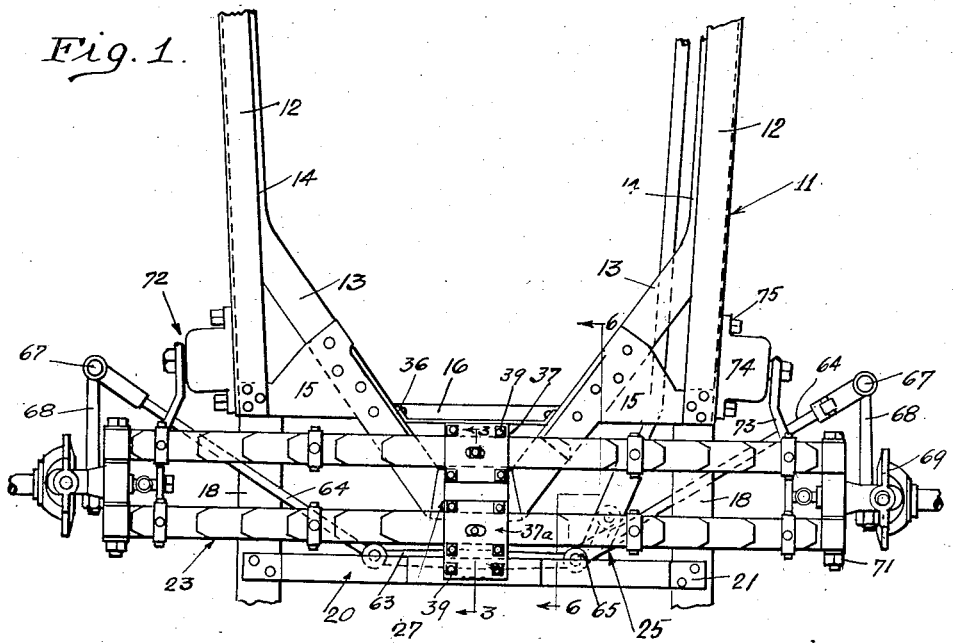
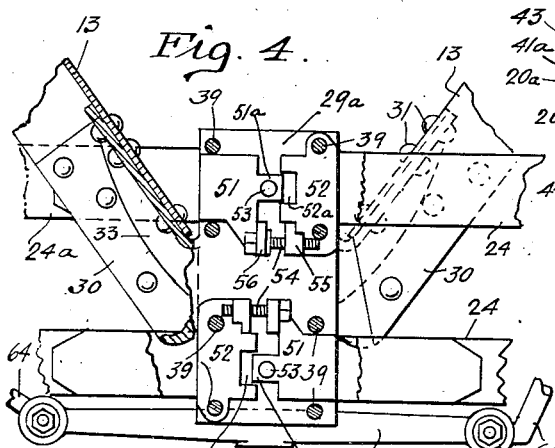
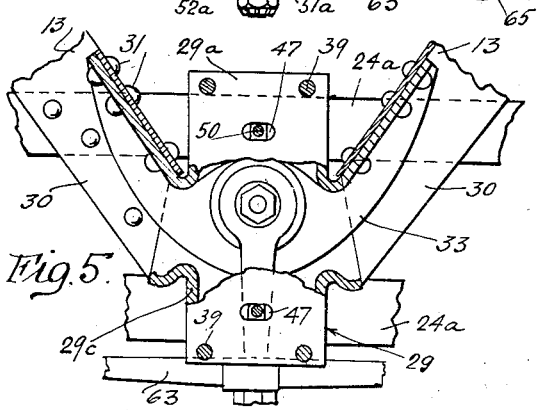
Inventors
Oscar F. Lundelius
Melvin N. Lefler
Attorney.

March 30, 1937.  O. F. LUNDELIUS ET AL  2,075,531
VEHICLE CHASSIS-FRONT END CONSTRUCTION
Filed Aug. 7, 1933   2 Sheets-Sheet 2
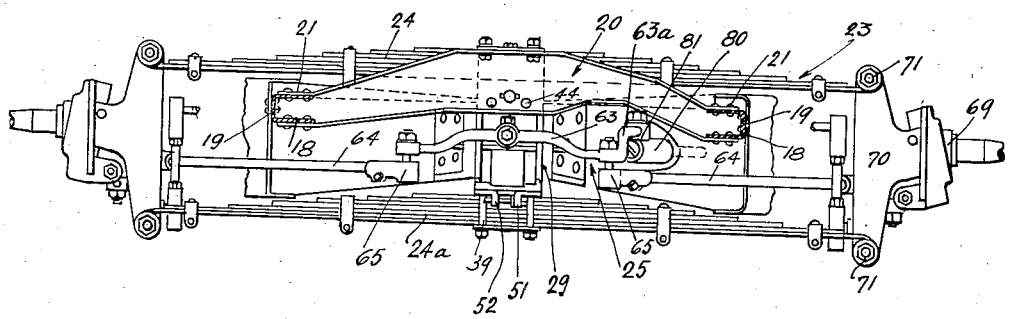
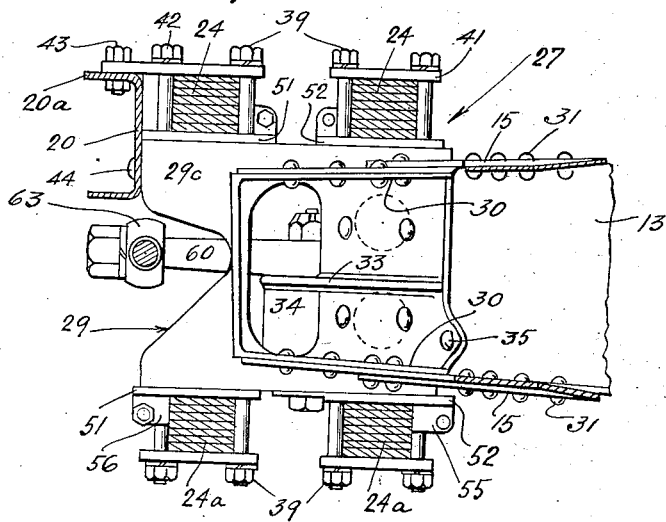
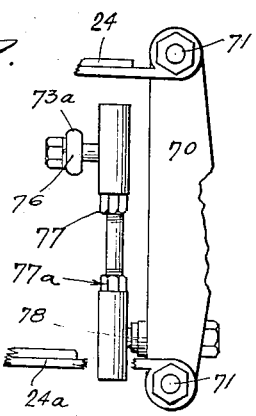
Inventors.
Oscar F. Lundelius.
Melvin N. Lefler.
Attorney.

Patented Mar. 30, 1937

2,075,531

UNITED STATES PATENT OFFICE 2,075,531

VEHICLE CHASSIS-FRONT END CONSTRUCTION

Oscar F. Lundelius and Melvin N. Lefler, Los Angeles, Calif., assignors to Lundelius & Eccleston Motors Corporation, Los Angeles, Calif., a corporation of Delaware Application August 7, 1933, Serial No. 683,928

5 Claims. (Cl. 280—106.5)

The principal object of this invention is to provide improvements in front end construction of vehicle chassis, certain phases of the invention being particularly applicable to automobile chassis in which the frame is connected with the wheels by way of transverse spring assemblies. In other of its aspects the invention deals with improvements in the chassis parts comprising the subject-matter of Patent No. 1,886,963, granted November 8, 1932, to Oscar F. Lundelius, et al., on Steering gear.

In accordance with the invention, we have provided a novel frame construction in which certain of the forward frame members have a V-shaped arrangement and converge toward the front of the frame, these convergent members serving, in our preferred chassis construction, to support the springs and parts of the steering gear. Additional features of the invention are more directly concerned with improvements in the spring mounting and in the provision of spring adjusting means operable to shift the springs longitudinally.

While the invention contemplates a number of additional objects and features, these as well as the aforementioned objects will be explained to best advantage without necessity for further preliminary comment, from the detailed description to follow.

Throughout the description reference is had to the accompanying drawings, in which:

Figure 1 is a plan view showing a typical front end chassis construction embodying the invention;

Fig. 2 is a front elevation of Fig. 1;

Fig. 3 is an enlarged section on line 3—3 of Fig. 1;

Figs. 4 and 5 are sectional views looking down on lines 4—4 and 5—5, respectively, of Fig. 3, certain of the parts being broken away to more clearly show the construction;

Fig. 6 is an enlarged section on broken line 6—6 of Fig. 1; and

Fig. 7 is a fragmentary enlargement of the snubber linkage connected with the wheel carrier.

As best shown in Fig. 1, the frame 11 of the chassis comprises a pair of channel-shaped side rails 12, of which the forward portions only are shown. A pair of channel-section frame members 13 connect with the side rails at points 14 spaced rearwardly of the frame from the forward ends of the side rails. Members 13 converge toward the front of the frame and are interconnected at their forward ends as will hereinafter appear. Side rails 12 are connected with convergent members 13 by means of plates 15 riveted to the members as indicated. We preferably interconnect the convergent members 13 by a transverse brace 16 spaced a suitable distance from the front ends of the members. Longitudinally extending rails 18 are connected at 19, see Fig. 2, with the side rails 12 and project forwardly to form extensions thereof. A front and transverse frame member 20, shaped as most clearly illustrated in Fig. 2, connects at 21 with members 18, the transverse member 20 being vertically offset to connect with the spring mounting parts, hereinafter described, and to provide clearance beneath for the steering gear parts.

A transversely extending spring assembly, generally indicated at 23, is mounted on convergent members 13, the spring assembly being typically illustrated as comprising two pairs of vertically spaced springs 24 and 24a, although it will be understood that the springs may be of any suitable number and arrangement. Members 13 serve also to support parts of the steering gear, generally denoted at 25, the details of which are fully described in the patent to Lundelius et al., referred to hereinabove. The arrangement of the frame parts, and especially convergent members 13, renders the frame particularly suited to the mounting of the spring assembly and steering gear parts in the positions illustrated, and extremely strong to resist shock and impact stresses transmitted by way of the springs and their mounting. Stresses applied longitudinally to the frame through the spring mounting are taken directly to members 13, and through them transmitted to side rails 12, members 15 serving to give added strength both as against longitudinal and transverse stresses.

While in the broad aspects of the invention, convergent members 13 may be interconnected at their forward ends and the spring assembly mounted thereon in any suitable manner, we preferably provide a separately constructed spring mounting, generally indicated at 27, interposed between and interconnecting the convergent ends of members 13 as best illustrated in Figs. 3 to 6. Mounting 27 comprises a rectangularly tubular structure 29 having top and bottom walls 29a, 29b, and side walls 29c, the front and rear ends of the box being open. Diverging channel-shaped arms 30 are formed integrally with the side walls 29c of the box and project within and in overlapping relation with the forward ends of frame members 13, the parts being connected by rivets 31. The mounting is reenforced by a horizontally extending rib 33 formed integrally with arm portions 30 and the upper end of tubular housing 34 for the steering arm spindle, later described. The rear ends of arms 30 may also be connected through members 13 with transverse member 16, holes 35 in the rear ends of web portions 30a of the arms receiving rivets or bolts 36 which connect the transverse member 16 with members 13.

Upper and lower pairs of springs 24 and 24a are attached to the top and bottom surfaces of box mounting 29 by means of center clamps 37, 37a and 38. The invention broadly contemplates the use of any suitable type of connection or mounting for attaching the springs to convergent frame members 13, although the herein illustrated type of adjustable center clamp may be regarded as preferred. Each of the center clamps comprises two pairs of stud bolts 39 threaded into bosses 40 in the top and bottom walls of the box mounting, the spacing of the pairs of bolts at opposite sides of the spring being substantially equal to the width of the spring so that the bolts confine the spring against lateral displacement. The centers of the springs are clamped by strap plates 41 through which bolts 39 extend and which are brought to bear against the springs by nuts 42 on the bolts. As shown most clearly in Fig. 3, plate 41a of the forward upper clamp 37a is attached by bolts 43 to top flange 20a of the transverse frame member 20, the forward end of box 29 also being attached to this frame member by rivets 44 passing through lugs 45 projecting inwardly from the side walls of the box. Openings 46 and 47 are provided in strap plates 41, and in top and bottom walls 29a, 29b of the box structure to receive nuts 48 and heads 49 of the spring center bolts 50, openings 46 and 47 being in the form of slots extending longitudinally of the springs.

It will be observed that both the vertical load and the horizontal thrust longitudinally of the frame, are taken by the spring mounting 27 and transmitted to the frame members. The present frame construction has been particularly designed with the view of affording maximum strength and rigidity, and the most effective distribution and transference to the frame members, of the load taken by the spring mounting. By extending the side rails 12 by members 18 projecting forwardly of the springs, and then connecting these extensions with the spring mounting by the transverse member 20, we provide two triangular trusses, comprising members 13, 18 and 20, supporting the spring mounting. These trusses form a rigid structure capable of withstanding the most severe loads, either vertical or horizontal, that may be communicated from the springs to the frame, and, by virtue of the arrangement of the truss members, any interference with the springs is avoided.

Because of variations in the lengths of different springs or because of longitudinal dimensional inaccuracies in individual springs, it may become necessary to adjust or shift one or more of the springs longitudinally to compensate for such inaccuracies. For this purpose we have included in the spring mounting, means whereby the springs may be shifted longitudinally to adjusted position and thereafter held securely against movement from such position. Adjustable spring mountings of this general type are also shown and broadly claimed in our copending application on Vehicle spring mounting, Ser. No. 683,927, filed on even date herewith, now Patent No. 2,006,644, dated July 7, 1935.

The adjustment parts for each spring being similar, a description of one will suffice for all.

Our preferred form of spring adjusting means comprises a pair of plates 51 and 52, see Fig. 4, placed between the springs and the top and bottom surfaces of the box mounting 29. Bolts 39 pass through openings in plate 52 to hold the latter against movement both transversely and longitudinally of surface 29a of the box. Plate 51, however, though confined by the bolts 39 against movement longitudinally on surface 29a, may be moved transversely thereof, toward or away from plate 52. The latter has a recess 52a within which tongue 51a of plate 51 projects, and the tongue has a central opening 53 through which head 49 of the spring center bolt extends. Movement of plate 51 toward or away from plate 52 is accomplished by adjusting screw 54 threaded through lugs 55 and 56 formed integrally with the plates and offset to one side of the spring.

It will be seen that by reason of the spring center bolt head being confined within opening 53 of the adjusting plate, movement of the latter by operation of screw 54 will result in longitudinal shifting of the spring. In order to adjust the spring, assuming the latter to be clamped within its center mounting, nuts 42 first are loosened to release the spring for longitudinal movement. Then by turning screw 54, plate 51 is caused to move and shift the spring longitudinally to adjusted position in the manner hereinabove described, slots 46 and 47 having sufficient extent to permit movement therein of the nut and head of the spring center bolt within the desired range of adjustment. After the spring has been shifted to its adjusted position, nuts 42 may then be tightened to securely clamp and hold the spring against further longitudinal movement.

As previously mentioned, the box structure 29 serves also as a mounting for parts of the steering gear 25. Referring to Fig. 3, the steering gear parts directly mounted on the box 29, comprise a movable T-shaped steering element which includes a horizontally swinging arm 60 carried on spindle 61 journaled in bearings 62 within a housing 34. Arm 60 carries cross piece or head 63 to the ends of which tie rods 64 are connected, by universal joints 65, the tie rods extending diagonally between the springs. Side walls 29c of the box 29 are recessed at 66 to permit the T-shaped steering arm to swing within its full range of movement. The outer ends of tie rods 64 connect through universal joints 67 with steering knuckle arm 68 of the wheels 69. The wheels are joined to wheel carriers 70 to which the ends of the springs are pivotally connected at 71, the wheel carriers being vertically movable with the wheels as the latter are deflected vertically upon encountering road irregularities.

Head 63 of the steering arm carries an extension 63a, see Fig. 2, to which a drag link 80 is pivotally connected at 81. By longitudinal movement of the drag link through usual connections with the steering wheel not shown the T-shaped steering arm is actuated to impart, through the tie rods, steering movent to the wheels.

Excessive deflection of the springs as a result of extreme vertical displacement of the wheels when abnormal road irregularities are encountered, is resisted by snubbing devices, generally indicated at 72, which preferably connect directly with the wheel carriers. Each of the snubbers 72 comprises a forwardly extending and vertically oscillatory arm 73 connecting with a spring or hydraulic type snubber body or box 74 bolted at

75 to side rails 12 of the frame. Any one of a variety of known forms of snubber boxes may be readily adapted to our purpose, as will be recognized by those familiar with the art. The forward end 73a, see Fig. 7, of snubber arm 73 is pivotally connected at 76 with an adjustable linkage 77 attached to the wheel carrier 70 by a pivotal joint at 78 which will allow oscillatory movement of the linkage 77 in conformity with the arc described by the forward end of arm 73 as the springs flex.

The described features of construction pertaining more specifically to the spring mounting comprise the subject matter of a divisional application filed by us on January 26, 1934, Ser. No. 708,390, now Patent No. 2,042,853, dated June 2, 1936, on Automobile spring mounting.

We claim:

1. Front end vehicle chassis construction comprising a frame having longitudinally extending side rails, a pair of members having connections with the side rails and converging between said rails toward the front end of the frame, plates connecting said convergent members intermediate their ends with said side rails at points spaced forwardly of the first mentioned connections, side rail extensions projecting forwardly from said plates, and means interconnecting the front portions of said extensions.

2. Front end vehicle chassis construction comprising a frame having longitudinally extending side rails, a pair of members having connections with the side rails and converging between said rails toward the front end of the frame, frame plates connecting said convergent members intermediate their ends with the side rails at points spaced forwardly from the first mentioned connections, side rail extensions projecting forwardly from said plates, and means connecting said extensions with the front portions of said convergent members.

3. Front end vehicle chassis construction comprising a frame having longitudinally extending side rails, a pair of members having connections with the side rails and converging between said rails toward the front end of the frame, said members being joined at their forward convergent ends, side rail extensions projecting forwardly in substantial alinement with said side rails, and a front transverse frame member connected to said extensions and to the front ends of said convergent members.

4. Front end vehicle chassis construction comprising a frame having longitudinally extending side rails, a pair of members having connections with the side rails and converging between said rails toward the front of the frame, a front transverse frame member connected to the side rails, a support connected to said convergent members and to the said transverse frame member and a movable steering member mounted on said support and extending below said transverse member.

5. Front end vehicle chassis construction comprising a frame having longitudinally extending side rails, a pair of members having connections with the side rails and converging between said rails toward the front of the frame, a front transverse frame member connected to the side rails, a spring support connected to said convergent members and to the said transverse frame member, a pair of vertically spaced transverse springs connected to said support, said springs extending above and below the side rails and projecting beyond them, and a movable steering member mounted on said support and extending below said transverse member.

OSCAR F. LUNDELIUS.
MELVIN N. LEFLER.